US012606018B2

(12) United States Patent
Wilke et al.

(10) Patent No.: US 12,606,018 B2
(45) Date of Patent: Apr. 21, 2026

(54) COVERING DEVICE FOR A VEHICLE AND ACTUATOR

(71) Applicant: ILLINOIS TOOL WORKS INC., Glenview, IL (US)

(72) Inventors: Zsolt Wilke, Bad Mergentheim (DE); Andreas Rudolf, Würzburg (DE); Christian Beck, Röttingen (DE); Matthias Hegwein, Ippesheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 78 days.

(21) Appl. No.: 18/739,949

(22) Filed: Jun. 11, 2024

(65) Prior Publication Data

US 2024/0326581 A1     Oct. 3, 2024

Related U.S. Application Data

(62) Division of application No. 17/299,640, filed as application No. PCT/US2019/064811 on Dec. 6, 2019, now Pat. No. 12,065,032.

(30) Foreign Application Priority Data

Dec. 11, 2018     (DE) ..................... 10 2018 131 807.3
May 31, 2019     (DE) ..................... 10 2019 114 706.9

(51) Int. Cl.
B60K 15/05          (2006.01)

(52) U.S. Cl.
CPC ........ B60K 15/05 (2013.01); B60K 2015/053 (2013.01); B60K 2015/0538 (2013.01);
(Continued)

(58) Field of Classification Search
CPC ................ B60K 15/05; B60K 2015/05; B60K 2015/0538; B60K 2015/0507;
(Continued)

(56) References Cited

U.S. PATENT DOCUMENTS

| 6,181,094 B1 | 1/2001 | Menke |
| 6,194,854 B1 | 2/2001 | Uchibori et al. |

(Continued)

FOREIGN PATENT DOCUMENTS

| CN | 101391577 A | 3/2009 |
| CN | 204161099 U | 2/2015 |

(Continued)

OTHER PUBLICATIONS

PCT, International Search Report and Written Opinion, International Application No. PCT/US2019/064811, date of mailing Mar. 25, 2020, 11 pages.
(Continued)

*Primary Examiner* — Dennis H Pedder
(74) *Attorney, Agent, or Firm* — THOMPSON HINE LLP

(57)          ABSTRACT

A covering device for a vehicle, includes: a cover; a drive element formed to enable a movement of the cover, wherein the drive element brings about a force which acts on the cover. The covering device has a force-limitation apparatus which limits the force brought about by the drive element to a limit force so that the covering device is protected in the event of an overload acting on the covering device and/or a user is protected when using the covering device. An actuator has a drive apparatus with a drive element; an output drive element; and a force-decoupling apparatus. The force-decoupling apparatus is formed so that it at least temporarily does not output a force taken up by the drive element or at least temporarily outputs it in a delayed manner to the output drive element.

14 Claims, 7 Drawing Sheets

(52) U.S. Cl.

CPC ................. *B60K 2015/0546* (2013.01); *B60K 2015/0561* (2013.01)

(58) Field of Classification Search

CPC .... B60K 2015/0515; B60K 2015/0546; B60K 2015/053

USPC ....................................................... 296/97.22

See application file for complete search history.

(56) References Cited

U.S. PATENT DOCUMENTS

| | | | |
|---|---|---|---|
| 8,820,561 | B2 | 9/2014 | Bauer |
| 10,384,534 | B2 | 8/2019 | Guardianelli |
| 2014/0084620 | A1 | 3/2014 | Frommann |
| 2019/0292830 | A1 | 9/2019 | Irle |

FOREIGN PATENT DOCUMENTS

| | | | |
|---|---|---|---|
| DE | 19842690 | A1 | 3/2000 |
| DE | 10304701 | A1 | 8/2004 |
| DE | 10334719 | A1 | 2/2005 |
| DE | 69920610 | T2 | 2/2005 |
| DE | 102004047314 | A1 | 3/2006 |
| DE | 102012018489 | A1 | 3/2014 |
| DE | 102015012237 | A1 | 3/2017 |
| DE | 102016124155 | A1 | 6/2018 |
| EP | 0985573 | B1 | 9/2004 |
| EP | 3078792 | A1 | 10/2016 |
| JP | 2017081383 | A | 5/2017 |

OTHER PUBLICATIONS

Baukholt et al, "Actuator motor drive for a door or flap of a motor vehicle has force-fitting input and output shafts that are automatically separated when the torque applied exceeds a threshold amount", Pub: Mar. 30, 2006, Publisher: European Patent Office, Edition: DE 102004047314A1 (Year: 2006).

COVERING DEVICE FOR A VEHICLE AND ACTUATOR

TECHNICAL FIELD

The invention relates to a covering device for a vehicle. The invention furthermore relates to an actuator, preferably for use in the case of a covering device of a vehicle.

BACKGROUND

A wide variety of different embodiments of covers or covering devices are known in practice for vehicles.

It is therefore customary, for example in the case of camper vans, for a wide range of different connections and/or accesses to stowage spaces to be concealed by means of service flaps.

In the case of conventional motor vehicles, use is furthermore made of covers or covering devices for concealing fuel fillers for fuels such as, for example, gasoline, diesel, gas, hydrogen or E-fuel. In the case of electric vehicles, in contrast, power connections have to be concealed by means of covering devices. Such a covering device can also be used to cover, for example, stowage spaces in the interior of a vehicle.

Furthermore, it is also possible for covers and recesses or compartments arranged behind the same to be used in the region of washer-fluid tanks or of water tanks for feeding water into internal combustion engines in order to increase their performance/efficiency or for feeding other additives.

Covers are used for concealing purposes here primarily for esthetic reasons. The covers should therefore be flush with the outer contour of the vehicle, in order to give an esthetically pleasing overall appearance.

In addition to the esthetic reasons, the covers are also used, to some extent, to regulate access to the fuel tank or the recess or compartment (closable covers). It is frequently also the case that the covers also meet the sealing-related requirements behind the cover. In particular in the case of charge ports or recesses, it is necessary to provide sealing in the region of the plug, the sealing also being ensured here, in particular, by seals which are injection molded on a hinge arm.

The covering devices themselves are based on different principles. Thus, for example, mechanical and automatic covering devices are known.

Mechanical covering devices, which have to be opened and closed by hand, have the disadvantage that the user can get dirty hands when opening and closing the covers. Moreover, users are increasingly expecting more and more comfort and luxury in vehicles, and manually openable covers are no longer able to meet these requirements nowadays.

Accordingly, covering devices which open and close automatically have been developed for vehicles. The opening and closing processes here are achieved by a motor, which drives the cover and/or a hinge arm, pivot arm or any other desired element thereof.

These covering devices, however, have the problem that the motor requires a relatively high level of force to close and open. As a result, during closure as a result of force provided by the motor, there is a risk of injury if a user's or passenger's fingers pass between the cover and the vehicle body and get caught during closure. The motors which are usually used close here with such a high level of force that in particular children are at high risk of getting injured.

Moreover, it is possible for the covering device to be damaged during the opening process by means of force provided by the motor. If someone is holding a lower region of the cover, or if a braking load is acting on said region of the cover for other reasons, an extremely effective lever is created and the motor can damage the covering device.

In addition, drive elements on driven (automatic) covers have to meet requirements relating to compactness (installation space and mounting) while having a simultaneously high performance level (brought about by the high level of inertia of the cover and of the fastening means). This frequently results in a high transition ratio between the electric motor and drive element. This, in turn, can result in the drive element being of self-locking design, and therefore the cover cannot move independently of the actuator. This also means that, in the event of a power failure in the vehicle, when the drive element can no longer be driven, there is no longer any access to the recess or compartment, or to the fuel tank or the charging plug.

The above-described requirements which have to be met by the compactness of the drive elements also relate, in particular, to the actuator. It has not been possible up until now, in particular on account of the disadvantageous dimensioning around the output drive spindle of the actuator, for actuators to be integrated directly in covering devices (for example tank-filler compartments and charge ports or recesses). Moreover, there is also the disadvantage here that, during manual closure of the covering device, the gear mechanism is not sufficiently protected against damage and there is also a high risk of a user being injured.

SUMMARY

The invention is therefore based on the object of specifying a covering device for vehicles which does away with the aforementioned problems and disadvantages of the prior art. In particular, it is the object of the present invention to specify a covering device which minimizes the risk of injury and avoids damage to the system.

The invention is furthermore based on the object of specifying an actuator which does away with the aforementioned problems and disadvantages of the prior art. In particular, it is the object of the present invention to specify an actuator which is of extremely compact design, minimizes the risk of injury and avoids damage to the system.

The solution according to the invention involves forming a covering device for a vehicle, having the following: a cover which is formed (e.g., configured, shaped, sized and/or operational) to cover an opening and/or a recess and/or the like in the vehicle; a drive element which is formed to enable (e.g., effect or cause) a movement of the cover, wherein the drive element brings about a force which acts on the cover and which enables the movement of the cover, wherein the covering device furthermore has a force-limitation apparatus which limits the force brought about by the drive element to a limit force so that the covering device is protected in the event of an overload acting on the covering device and/or a user is protected when using the covering device.

The covering device according to the invention achieves the object in a satisfactory manner.

In particular, it is possible for the force transmitted by the motor to be limited by means of the force-limitation apparatus such that passengers cannot be injured or the covering device cannot be damaged.

In addition, in the event of a power failure in the vehicle, when the drive element can no longer be driven, it is possible to enable access to the recess or compartment, or to the fuel tank or the charging plug, via the force-limitation apparatus.

This application makes reference throughout to covers and covering devices, wherein the expression should be regarded as being a collective term for covers in general which, irrespective of their precise configuration, are intended merely to perform the function of reversibly closing an opening or a recess or compartment. Consequently, the term "cover" covers a wide range of different embodiments, such as for example swing-action devices or rolling-action devices.

The element which is driven by the drive element here can be a hinge arm of the cover, the cover itself or any desired element in a kinematic system of which the drive causes the cover to move.

The force acting on the cover is not necessarily a force in the mechanical sense. Rather, it can also be a torque.

According to an advantageous development of the invention, the covering device is formed such that the force-limitation apparatus is an automatically torque-shifting safety clutch which separates the cover from the drive element when the limit force is reached.

In this context, separation means separation in terms of force, and therefore it is at least no longer the overall force brought about by means of the drive element, and preferably none of this force, which acts on the cover or an element driving the cover.

According to an advantageous development of the invention, the force-limitation apparatus has a force-take-up part and a force-output part.

The force-take-up part and the force-output part can, of course, be a torque-take-up part and a torque-output part, respectively.

According to an advantageous development of the invention, the force-take-up part forms a part of a sliding block guide which is connected to the drive element.

"Connected" here means, in general, that the components are arranged in relation to one another such that force can be transmitted between them. In particular any desired number of components can be interposed here for force-transmitting purposes (that is to say connecting purposes).

As an alternative to this force transmission between the drive element and force-limitation apparatus, other means of force transmission are also conceivable. The sliding block guide, however, has advantages to the effect that it is fairly robust (in particular in relation to dirt) and has a self-cleaning function. This is made possible in particular also in that the driving operation of the force-limitation apparatus need not be particularly precise and the drive element is also able to continue rotating beyond the stops of the cover.

According to an advantageous development of the invention, the force-take-up part has a tooth region which is preferably directly connected to an output gear wheel of the drive element.

The term "directly" in this context means that no other gear wheel is interposed.

The tooth region of the force-take-up element preferably covers substantially a circle portion of 90°. The design described provides for a straightforward and compact construction, straightforward activation being possible as a result of the gear-wheel pairing.

In the case of a modular embodiment, the circle portion covers at least 155°, so that it can be used with a four-point kinematic system.

According to an advantageous development of the invention, the force-output part is connected to a pivot arm of the cover and has an axis of rotation which corresponds to the pivot axis of the pivot arm.

The pivot arm and force-output part can be connected, for example, by means of a shaft/hub connection, wherein at least certain regions of the force-output part are designed in the form of a shaft and at least certain regions of the pivot arm are designed in the form of the hub. In this respect, in particular an embodiment formed by a driver element, i.e. for example by means of a feather key and corresponding groove, is particularly easy to realize. As an alternative, force-transmission by means of a toothing formation is also conceivable here.

If the axis of rotation of the force-output part corresponds to the pivot axis of the pivot arm, i.e. said axes lie along a common line, unnecessary loading of the covering device is prevented. Furthermore, a compact construction is realized.

According to an advantageous development of the invention, the force-limitation apparatus has an elastic element, preferably a torsion spring, for transmitting force, which elastic element is preferably arranged at least substantially within the force-take-up part.

The two ends of the elastic element here butt preferably both against the torque-take-up part and against the torque-output part.

The torsion spring here functions as an overload coupling. The limit force, in this case the limit torque, between the drive unit and cover is determined here via the pretensioning of the spring and the spring constant/spring rate thereof.

Overall, the torsion-spring design results in a straightforward, cost-effective, compact and, in particular, very robust design.

According to an advantageous embodiment of the invention, the force-limitation apparatus is a locking body clutch which has the following: at least one groove which is preferably formed in the force-output part; at least one locking body which, in a transmission state of the force-limitation apparatus, lies in the at least one groove; and at least one pretensioning body which pushes the at least one locking body into the at least one groove, wherein the at least one locking body reversibly slips out of the at least one groove when the limit torque is reached.

Of course, it is also conceivable, in this context, for the groove to be formed in the force-take-up part rather than in the force-output part.

In the transmission state of the force-limitation apparatus, the at least one locking body lies in the at least one groove, i.e. the locking body is latched in the groove such that force or a torque can be transmitted via said locking body.

In the non-transmission state of the force-limitation apparatus, the at least one locking body is, rather than being latched in the at least one groove, has slipped out of the same. This process is nevertheless reversible, and therefore the locking body can be moved back into the groove again.

The type of locking body here ranges from cones and balls to pins, use preferably being made of balls which transmit force at least substantially in a form-fitting manner. The limit force or the limit torque of the force-limitation apparatus can be adjusted and adapted via the pretensioning body.

According to an advantageous development of the invention, the force-limitation apparatus furthermore has a restoring mechanism which is formed to restore the force-limitation apparatus once more to a transmission state if the overload acting on the covering device is reduced or is no longer present.

Said restoring mechanism serves to transfer the force-limitation apparatus from the non-transmission state back into the transmission state again. If, for example, a passenger's finger has got caught between the cover and the vehicle body during closure of the covering device, the force-limitation apparatus decouples the drive element from the pivot arm when the limit force is reached, and therefore the passenger is not injured.

Since the drive element, however, continues to transmit a force or a torque to the force-take-up part of the force-limitation apparatus, it is possible to pretension a restoring mechanism, which ensures that the force-limitation apparatus is transferred into the transmission state again when the overload (in this case the caught finger) is no longer present.

According to an advantageous development of the invention, the restoring mechanism is pretensioned if the at least one locking body has reversibly slipped out of the at least one groove and restores the at least one locking body back into the at least one groove if the overload acting on the covering device is reduced or is no longer present.

According to an advantageous development of the invention, the restoring mechanism is a torsion spring which is fastened with a first side to the force-take-up part, is fastened with a second side to the force-output part and is arranged preferably at least substantially within the force-take-up part.

Since the torsion spring is arranged within the force-take-up part, a particularly compact construction is achieved. It is additionally expedient here if the torsion spring is arranged around a shaft-like region of the force-output part.

In contrast to the already mentioned torsion spring, which in the case of the force-limitation apparatus has been designed for actual force-limiting purposes, the torsion spring mentioned here merely performs the function of the restoring mechanism.

Depending on the configuration of the force-limitation apparatus, however, other configurations are also possible. In particular, the reverse configuration would also be conceivable.

According to an advantageous development of the invention, the force-limitation apparatus has the following: a control lever which is connected to the drive element; and an elastic element which is connected on a first side to the control lever and on a second side to the cover, preferably a pivot arm, wherein the drive element pretensions the elastic element, and wherein the elastic element brings about an opening process or closing process of the cover during relief of tension.

In the case of this embodiment, in contrast to the previous variant, the movement of the drive element is always separated (in time) from the movement of the cover. In more specific terms, the drive element, rather than moving the pivot arm or the cover directly, pretensions an elastic element which then, in turn, brings about the movement (opening process or closing process) of the cover.

Consequently, the force acting on the cover or the covering device is limited by the elastic element or the properties thereof. It is also possible, in the case of this embodiment, for the control lever to be designed in the form of a swan head, wherein the pivot axis of the pivot arm is arranged preferably on the head region. A suitable elastic element is also formed here by a spring, for example a torsion spring, which is fastened to the pivot arm at a location which is spaced apart from the pivot axis of the pivot arm.

According to an advantageous development of the invention, the drive element pretensions the elastic element by a lifting movement in such a manner that the direction of action of the elastic element is reversed between the opening and closing process of the cover.

This means that the spring can be reversed, and can be used for both directions (opening direction and closing direction).

According to an advantageous development of the invention, the drive element moves downward in order to initiate the opening process of the cover and thus moves the control lever into an upper position in which the elastic element is pretensioned in the first direction of action.

According to an advantageous development of the invention, the drive element moves upward in order to initiate the closing process of the cover and thus moves the control lever into a lower position in which the elastic element is pretensioned in the second direction of action.

In the first direction of action, the elastic element opens the cover and, in the second direction of action, it closes the same.

Of course, it is also conceivable, in this context, to design the control element such that the drive element is moved downward together with the control lever in order to initiate the opening process of the cover. Accordingly, both elements are moved upward during the closing operation. A reversal of the principle described is also conceivable.

According to an advantageous development of the invention, the cover is a fuel-tank cover or a charge-port cover of a vehicle.

Fuel-tank cover here is understood to mean the cover which is usually designed in the form of a flap and covers the fuel tank (gasoline, diesel, gas, hydrogen, E-fuel) of a vehicle. Furthermore, a charge-port cover is understood to mean the cover or flap which covers the power connections of a vehicle.

The cover can furthermore be a service cover or a cover in the region of fluid tanks.

The solution according to the invention furthermore consists in forming an actuator, preferably for use in the case of a covering device of a vehicle, wherein the actuator has the following: a drive apparatus with a drive element, which drive apparatus is formed to provide the actuator with a force; an output drive element which is formed to output force from the actuator; and a force-decoupling apparatus which is formed to take up force from the drive element and output it to the output drive element, wherein the force-decoupling apparatus is formed so that it at least temporarily does not output the force taken up by the drive element and/or outputs it in a delayed manner to the output drive element.

The actuator according to the invention achieves the object in a satisfactory manner.

The fact that the force-decoupling apparatus is formed so that it at least temporarily does not output the force taken up by the drive element to the output drive element means that the force-decoupling apparatus reversibly decouples the output drive element from the drive element at least temporarily in terms of force. The force-decoupling apparatus can thus be restored to the transmission state again. Furthermore, the fact that the force-decoupling apparatus is formed so that it (at least temporarily) outputs the force taken up by the drive element in a delayed manner to the output drive element means that the force directed from the drive element into the force-decoupling apparatus is stored on an interim basis and is output to the output drive element with a time delay.

Since the force-decoupling apparatus at least temporarily does not output the force taken up by the drive element to the output drive element, damage to the system can be avoided and the risk of injury to a user can be minimized. In particular, it is possible for the force-decoupling apparatus to ensure that the force (for example torque) is no longer transmitted when an element is blocked. The force is then preferably stored on an interim basis and then output to the output drive element in a delayed manner as soon as the element is no longer blocked.

For example, it would be conceivable for an element (covering device) to which force (torque) is output by the output drive element to be blocked (for example iced up). Transmission of force could then result in excessive loading in the system and, ultimately, in damage to the system (for example an actuator component). Therefore, an excessive force (for example higher than a limit force) is not trans-mitted by the force-decoupling apparatus as a result of at least temporary decoupling.

The expression "in a delayed manner" is understood to mean a time-delayed transfer of the force taken up, said transfer being caused by the force being stored in the force-decoupling apparatus and then output again.

The drive apparatus is preferably an electric motor and the drive element is particularly preferably a worm wheel. A particularly space-saving construction is thus ensured in combination with the other elements of the actuator.

Even if the actuator is preferably designed for use in a covering device of a vehicle, it can also conceivably be used at other locations of the vehicle. In particular, it can be used wherever a compact construction of the actuator is neces-sary.

According to an advantageous development of the inven-tion, the force-decoupling apparatus has an output element, an input element and a transmission element, which is arranged as a force-transmission and/or force-accumulator part between the output element and the input element.

The transmission element is designed such that it can transmit force from the input element to the output element. Moreover, the transmission element is designed such that, for example as a result of decoupling (jaw clutch; friction clutch) and/or of interim storage (spring element; friction clutch), it performs the task of the force-decoupling appa-ratus (at least temporarily decoupling of the output element from the input element).

According to an advantageous development of the inven-tion, the transmission element is a jaw clutch.

If the transmission element is formed by means of a jaw clutch, one side of the jaw clutch can be the input element and the other side of the jaw clutch can be the output element, these being connected to one another by means of jaws (forming the actual transmission element). The jaws are designed here such that, when they exceed a force (torque, e.g. limit force) which is to be transmitted, they are sepa-rated from one another (slip apart from one another) such that, at least temporarily, there is no more force transmitted.

According to an advantageous development of the inven-tion, the force-decoupling apparatus is an automatically torque-shifting safety clutch which separates the output element from the input element at least temporarily when a limit force is reached.

The force-decoupling apparatus here is designed in a manner similar to the already described force-limitation apparatus of the covering device. Of course, for operation of the covering device with an actuator according to the invention (said actuator having the force-decoupling appa-ratus), there is no longer any need for the covering device to be formed with an additional force-decoupling apparatus. It is also the case that there is no longer any need, in the case of a covering device according to the invention (said cov-ering device having the force-limitation apparatus), for the actuator to be formed with a force-decoupling apparatus. The two embodiments should therefore be understood as alternatives, force decoupling taking place, in one case, within the actuator, and, in the other case, downstream, outside the actuator.

If the force-decoupling apparatus is designed in a manner similar to the already described force-limitation apparatus, the input element corresponds to the force-output part and the output element corresponds to the force-take-up part.

The force-decoupling apparatus can be designed here, as described above, in the form of a locking body clutch which has the following: at least one groove which is preferably formed in the input element; at least one locking body (transmission element) which, in a transmission state of the force-decoupling apparatus, lies in the at least one groove; and at least one pretensioning body which pushes the at least one locking body into the at least one groove, wherein the at least one locking body reversibly slips out of the at least one groove when the limit torque is reached.

Of course, it is also the case that all the aforementioned aspects which have already been discussed in the context of the force-limitation apparatus apply here.

This embodiment can furthermore have a restoring mechanism which is formed to restore once more the force-decoupling apparatus to a transmission state. The restoring mechanism here is pretensioned if the at least one locking body has reversibly slipped out of the at least one groove. Such a restoring mechanism can also be integrated in other embodiments of the force-decoupling apparatus.

According to an advantageous development of the inven-tion, the transmission element is a spring element, preferably a leg spring or a screw torsion spring.

The force-decoupling apparatus is thus designed such that it can store on an interim basis the force fed to the drive element and outputs said force to the output drive element in a delayed manner. In particular, the spring element takes up a force (or a movement or torque) from the input element, stores said force and outputs it to the output element in a delayed manner.

The characteristics of the actuator can be altered, and adapted to the corresponding requirements of the actuator, as a result of the spring strength being varied. Put in simple terms, force provided for example at the covering device can therefore be adapted for opening and closing the actuator.

The advantage in using a leg spring is that a compara-tively short housing is sufficient to ensure the necessary pretensioning force of the spring.

As an alternative to this, it would, of course, also be conceivable to use a spring element in the form of a torsion-bar spring or a torsion bar. Since a torsion-bar spring is narrower, and more elongate, than a leg spring, it is also possible for the actuator to be somewhat narrower, but elongate.

Overall, it is therefore possible for the selection of an appropriate spring to influence the dimensions of the hous-ing of the actuator. The actuator can therefore be adapted to the predetermined amount of installation space.

According to an advantageous development of the inven-tion, the spring element has a first end and a second end and is received at least substantially in the output element, wherein the first end of the spring element is in contact with the output element in such a manner that, during movement of the second end, the spring element is pretensioned by means of the input element so that force is transmitted from the spring element to the output element with a time delay at the first end.

A description is given here of a first movement direction or force-transmission direction of the drive element.

According to an advantageous development of the invention, the spring element is received at least substantially in the output element and a or the second end of the spring element is in contact with the output element in such a manner that, during movement of a or the first end, the spring element is pretensioned by means of the input element so that force is transmitted from the spring element to the output element with a time delay at the second end.

A description is given here of the second movement direction or force-transmission direction counter to the first movement direction of the drive element.

If the drive element is a gear wheel, the first (movement) direction is, for example, a rotation in the clockwise direction and the second (movement) direction is a rotation in the counterclockwise direction. The movement in the first direction here results, for example, in the covering device opening and the movement in the second direction results, for example, in the covering device closing.

Moreover, an extremely compact construction can be achieved by the spring element being received at least substantially in the output element.

According to an advantageous development of the invention, the transition element and the output element are formed at least substantially in the input element.

This also gives rise to a particularly compact construction of the actuator.

According to an advantageous development of the invention, the actuator has a housing in which at least the drive element, the output drive element and the force-decoupling apparatus are arranged, wherein the output drive element is arranged on an outer corner of the housing.

Since the output drive element is arranged on an outer corner of the housing, it is possible for a hinge arm/axis of the covering device to be driven directly. Such an arrangement of the output drive element therefore makes it possible for the actuator to be able to be integrated in conventional covering devices (for example fuel-filler compartments and charge ports or recesses).

According to an advantageous development of the invention, the actuator furthermore has a drive transmission element which is arranged between the drive element and the input element in such a manner that it transmits force from the drive element to the input element.

In other words, the drive transmission element is coupled between the drive element and the input element. The transmission ratio from the drive element to the drive transmission element is preferably a step-down ratio.

According to an advantageous development of the invention, the actuator furthermore has an output drive transmission element which is arranged between the output element and the output drive element in such a manner that it transmits force from the output element to the output drive element.

The output drive transmission element, the output drive element and at least one region of the output element are preferably in the form of a gear wheel.

It is preferably the case that the transmission ratio from the output element to the output drive transmission element is a step-down ratio and the transmission ratio from the output drive transmission element to the output element is a step-up ratio.

According to an advantageous development of the invention, the drive transmission element has a gear wheel and a worm wheel.

The gear wheel and the worm wheel here are preferably formed in one piece with one another.

In particular the gear wheel here is coupled to the drive element and the worm wheel is coupled to the input element of the force-decoupling apparatus.

An extremely compact construction can be achieved by the combination of worm wheel and gear wheel.

According to an advantageous development of the invention, the actuator furthermore has a position monitoring device, wherein the position monitoring device has a Hall sensor and/or a microswitch.

The Hall sensor here is preferably arranged on the output drive transmission element such that it monitors the position of the output drive transmission element. Accordingly, the Hall sensor allows conclusions to be drawn in relation to the position of the covering device, since the latter is connected directly (that is to say without any coupling) to the output drive transmission element. Of course, it would also be conceivable, in this context, for the Hall sensor to be arranged such that it monitors the position of the output element or the position of the output drive element.

However, monitoring the position of the output drive transmission element by means of the Hall sensor provides for a space-saving arrangement and is therefore preferred.

The microswitch monitors, for example, the position of the force-decoupling apparatus. In the case of the force-decoupling apparatus with output element, input element and spring element forming a transmission element, the microswitch monitors, for example, the position of the output element and the input element (relative to the microswitch). It is therefore possible for the microswitch to check whether the spring element is in a tensioned state or has been relieved of tension.

The microswitch can detect, for example, a start position (covering device is closed and drive device has not yet transmitted any force to the input element) and an end position (covering device (if not blocked) is open and drive device has transmitted all the drive power to the input element in order for the covering device to be opened) of the input element. If the input element is in the end position, there is no need for the covering device to be opened. If the latter is blocked, it cannot open and the force is stored on an interim basis in the spring element.

In summary, the microswitch preferably detects the position of the output element, a start position of the input element and an end position of the input element. The start and the end positions of the input element can be detected, for example, by means of cams or protuberances, which indicate the corresponding position on the input element and are detected by the microswitch

BRIEF DESCRIPTION OF THE DRAWINGS

The invention will be explained in more detail hereinbelow with reference to the description of exemplary embodiments, with reference to the accompanying drawings, in which.

DETAILED DESCRIPTION

Figure 1:
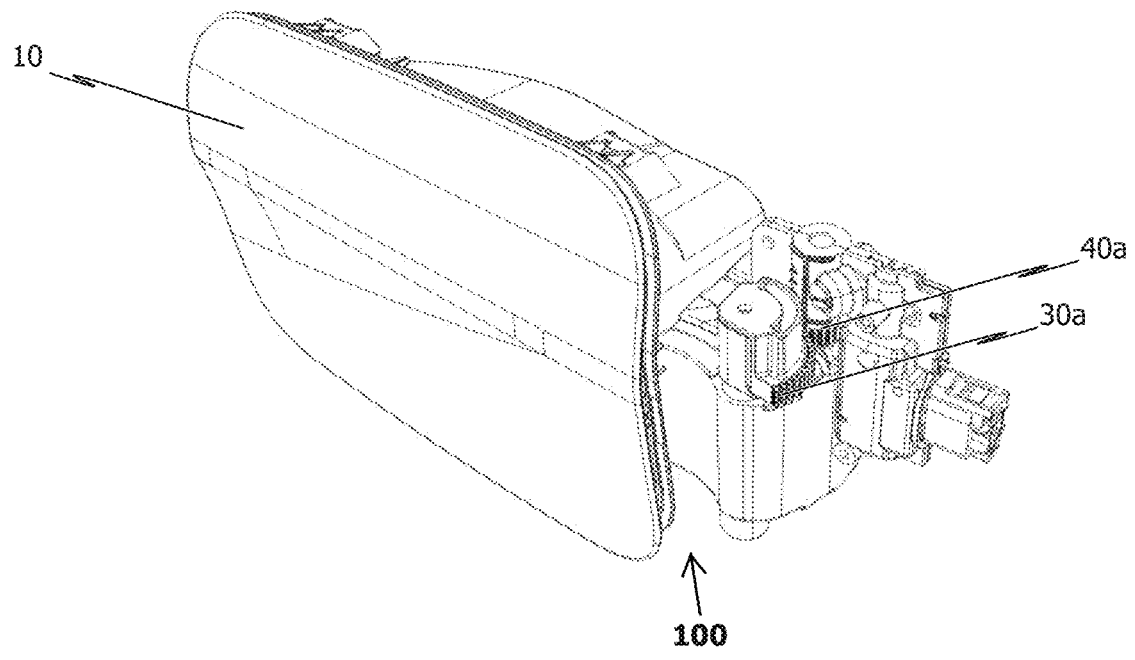
FIG. 1 shows a schematic plan view of a complete covering device according to a first embodiment of the present invention.

Reference will be made hereinbelow first of all to FIG. 1, which shows a schematic plan view of a complete covering device 100 according to a first embodiment of the present invention.

The covering device 100 has a cover 10, which is designed by way of example in the form of a flap and covers or closes an opening in a vehicle. A drive element 40*a* brings about an opening and closing operation of the cover 10, wherein a force-limitation apparatus 30*a* is located between the cover 10 and the drive element 40*a*.

Figure 2:
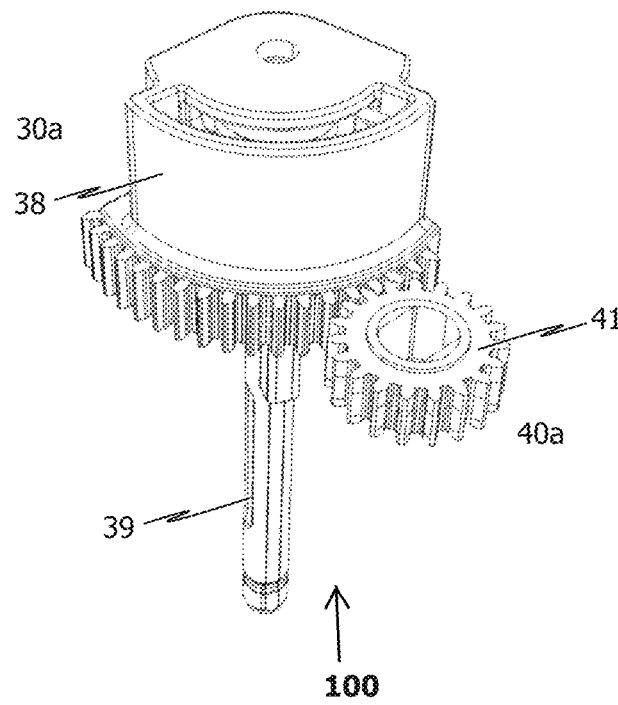
FIG. 2 shows a schematic plan view of a drive element and a force-limitation apparatus of the covering device according to the first embodiment of the present invention.

FIG. 2 shows a schematic plan view of the drive element 40*a* and the force-limitation apparatus 30*a*. In particular, an output gear wheel 41 of the drive element 40*a* is shown in engagement with a tooth region of a force-take-up part 38 of the force-limitation apparatus 30*a*. The force, in this case the torque, is thus transmitted from the output gear wheel 41 to the force-take-up part 38 of the force-limitation apparatus 30*a* and from said force-take-up part to a force-output part 39.

The force-output part 39 is connected to the cover 10. As can be seen in FIG. 2, the force-take-up part 38 forms a kind of housing, in the interior of which are arranged a region of the force-output part 39 and the actual force-limiting or torque-limiting components and/or elements.

Figure 3:
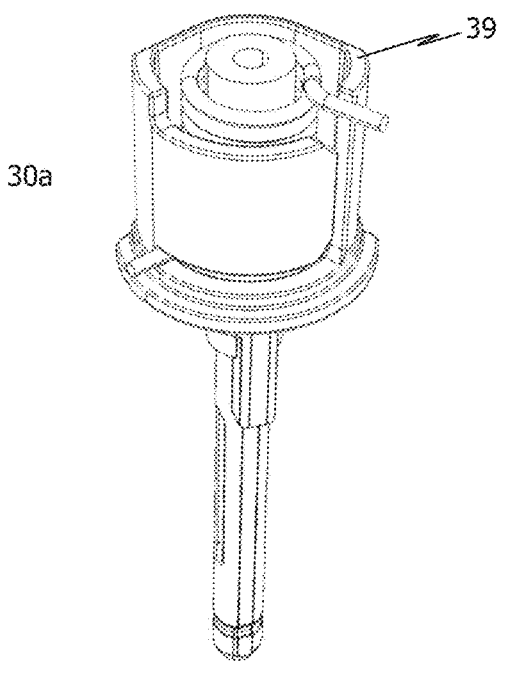
FIG. 3 shows a more detailed plan view of the force-limitation apparatus of the covering device according to the first embodiment of the present invention, wherein the force-take-up part has been cut away in order to show the construction of the force-output part.

FIG. 3 shows the force-limitation apparatus 30*a*, from which the force-take-up part 38 has been removed in order for the construction of the force-output part 39, in particular of that region of the force-output part 39 which is arranged within the force-take-up part 38, to be shown.

In its interior, the force-limitation apparatus 30*a* has a torsion spring for force-limiting purposes. At least some regions of the torsion spring are arranged around a shaft-like region or shaft of the force-output part 39, wherein there is sufficient space between the shaft and the torsion spring for the components not to be hindered in any way.

By virtue of the force-take-up part 38 moving (rotating), the spring outputs the movement (directly) to the force-output part 39. The limit force or the limit torque between the drive element 40*a* and cover 10, or in this case between the force-take-up part 38 and force-output part 39, is determined here via the pretensioning of the spring and the spring constant/spring rate thereof.

The torsion spring therefore performs the function of transmitting force (substantially without compression) and of limiting force (with compression). If the covering device has been blocked, the torsion spring is pretensioned by the drive element to the extent where the covering device opens smoothly when the blockage is removed. Of course, this also applies correspondingly to the closing process.

Each of the two discernible ends (legs) of the torsion spring here comes into contact both with the force-take-up part 38 and with the force-output part 39. If for example the force-take-up part 38, which cannot be seen here, is rotated in a clockwise direction, the upper leg is carried along, whereas the lower leg remains in abutment against the force-output part 39. If the force-take-up part 38 is rotated in the opposite direction, the lower leg is carried along, whereas the upper leg remains in abutment against the force-output part 39. Of course, a reversal of the aforementioned principle is also conceivable here.

There is preferably an amount of play formed between the legs of the torsion spring and those regions of the force-take-up part 38 and of the force-output part 39 which carry along the limbs during a movement. The force-limitation apparatus can thus be mounted to good effect. Since the motor always rotates the force-limitation apparatus somewhat too far, the covering device nevertheless corresponds to the movement without delay.

Figure 4:
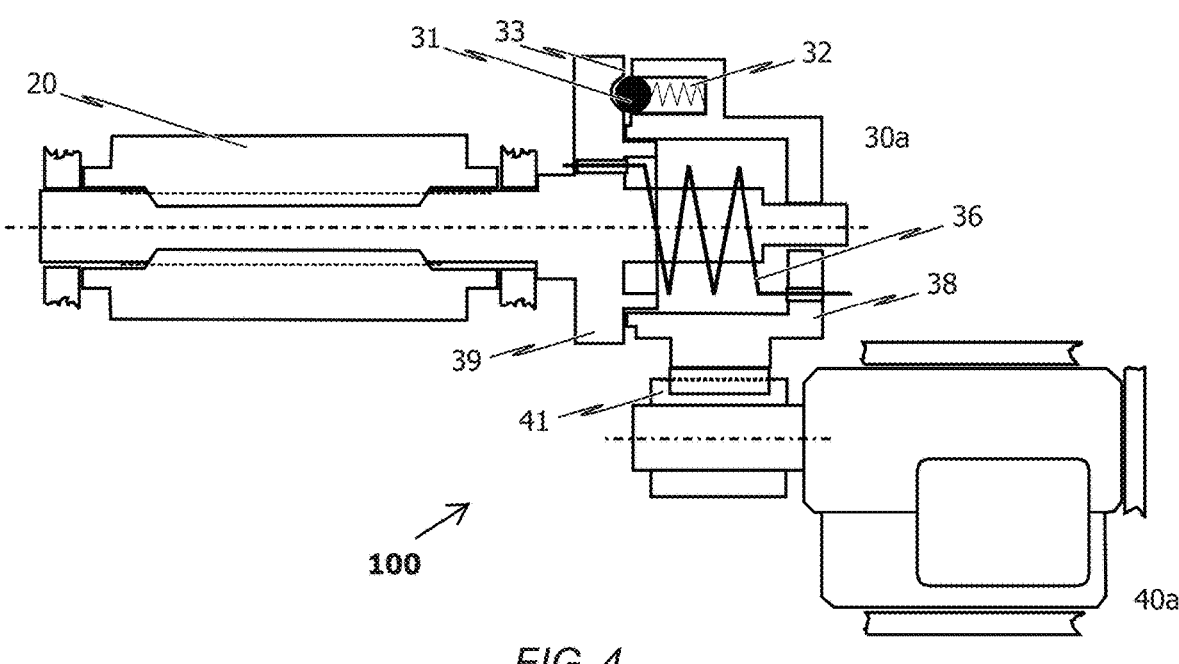
FIG. 4 shows a schematic diagram of the covering device according to a second embodiment of the present invention.

FIG. 4 shows a schematic diagram of the covering device 100 according to the second embodiment of the present invention. The force-limitation apparatus 30*a* has a locking body 31, a pretensioning body 32 and a groove 33. In the transmission state of the force-limitation apparatus 30*a*, the locking body 31 is pushed into the groove 33 by the pretensioning body 32, and therefore this can output a force, in this case a torque, to the force-output part 39.

A pivot arm 20 of the cover 10 is fastened to the force-output part 39. The pivot axis of the pivot arm 20 and the axis of rotation of the force-output part 39 here are located along a common axis. This axis is also the axis of rotation of the force-take-up part 38.

If the cover 10 or the pivot arm 20 is then held by a braking force or braking load, and if the critical torque of the force-limitation apparatus 30*a* is exceeded when driving operation takes place, the locking body 31 unlatches from the groove 33. Consequently, the force-limitation apparatus 30*a* is then located in a non-transmission state, in which there is no torque transmitted via the locking body 31 and the groove 33.

However, the drive element 40*a* continues to drive the force-take-up part 38 of the force-limitation apparatus 30*a*, and therefore the restoring mechanism 36, in this case the torsion spring, is pretensioned. The torsion spring is fastened with its one end to a region of the force-output part 39 and with its other end to a region of the force-take-up part 38. If the force-take-up part 38 rotates and the force-output part 39 is at a standstill, the torsion spring is pretensioned correspondingly.

As a result, as soon as the braking load which has prevented the cover 10 from moving is absent, the force-output part 39 is able to follow the force-take-up part 38 into the starting position again, in which the locking body 31 lies in the groove 33 (force-transmission state).

Figure 5:
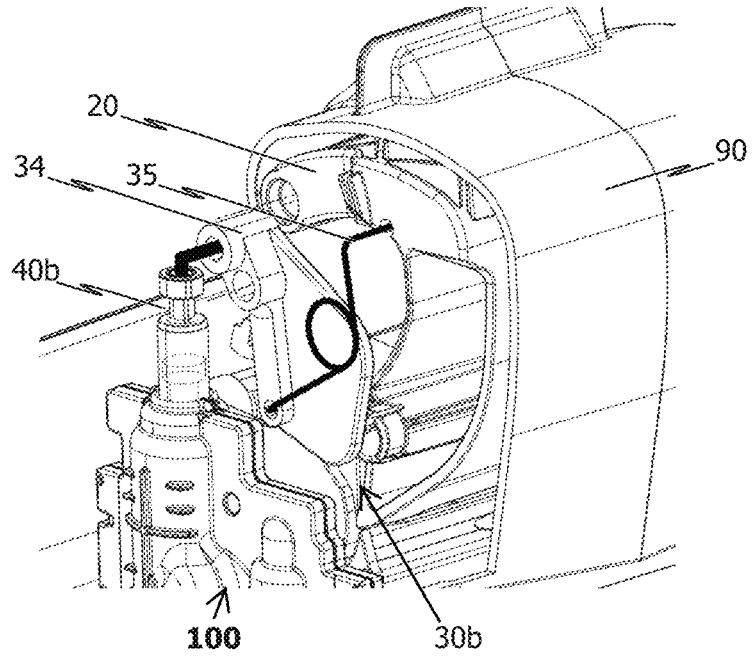
FIG. 5 shows a covering device according to a third embodiment of the present invention.

FIG. 5 is a schematic plan view of a covering device 100 according to a third embodiment of the present invention. The covering device 100 of the third embodiment likewise has a drive element 40b, said drive element performing a lifting movement. The covering device 100 furthermore has a control lever 34, the position of which can be altered by means of the drive element 40b from an upper position to a lower position, and vice versa.

The control lever 34 is connected to the pivot arm 20 via an elastic element 35. The elastic element 35, in turn, is a torsion spring, which is fastened with its one side in a spring bearing on the control lever 34 and is fastened with its other side on a spring bearing in the pivot arm 20.

The elastic element 35 or the torsion spring can be pretensioned by the movement of the control lever 34. For ease of illustration of the covering device 100, the elastic element 35 has been arranged in front of the control lever 34 in FIG. 5 and the rest of the figures. In actual fact, however, it is arranged, in the installed state, between the pivot arm 20 and the control lever 34.

The pivot arm 20 is designed differently to the pivot arm 20 of the first embodiment. In particular, the pivot arm 20 is in the form of a swan neck, wherein the pivot axis runs through the head. The pivot arm 20 is furthermore accommodated in a housing 90.

The operating principle of the covering device 100 according to the third embodiment differs from that of the first and second embodiments.

Figure 6:
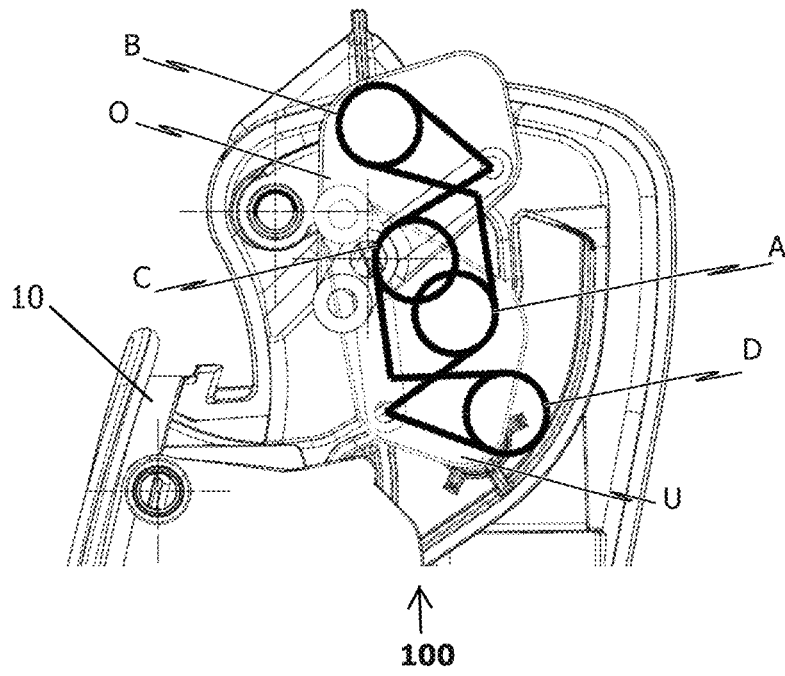
FIG. 6 shows a schematic diagram of the covering device according to the third embodiment of the present invention, with different states of the covering device, in particular of the control lever and of the elastic element, being depicted.

This is shown in combined fashion in FIG. 6. FIG. 6 depicts various spring positions of the elastic element 35 and various positions of the control lever 34.

Position A shows the elastic element (referred to hereinbelow as spring) in the closed rest position of the covering device 100. In this position, the control lever 34 is arranged in its lower position U. If the drive element 40b travels downward, the control lever 34 is transferred into its upper position O.

If the control lever 34 is in its upper position O, that is to say at the beginning of the opening process of the cover 10, the spring has been pretensioned in position B. The spring is then relieved of tension, and brings about the opening movement of the cover 10 in the process.

When the spring reaches position C, the cover 10 is located in its open rest position. If the drive element 40b then travels upward, the control lever 34 is moved into its lower position U and the spring is pretensioned in position D.

When the spring is relieved of tension from position D into position A, the cover 10 closes before it is located once again in its closed rest position.

The process can then begin anew.

The various positions of the covering device 100 according to the third embodiment are illustrated even more precisely in the following FIGS. 7 to 10.

Figure 7:
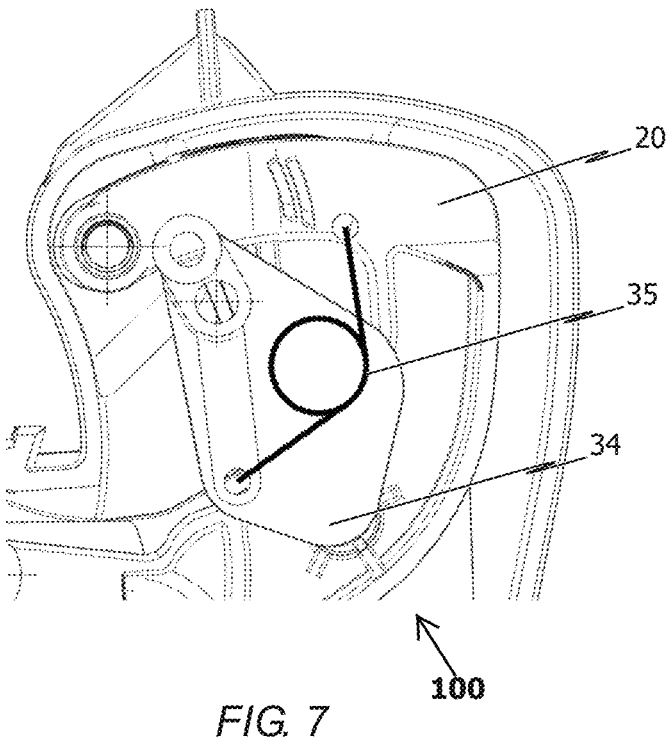
FIG. 7 shows a schematic illustration of the covering device according to the third embodiment of the present invention in a closed rest position.

FIG. 7 here shows the closed rest position of the cover 10, in which the spring or the elastic element 35 applies a closing torque to the pivot arm 20. The drive element 40b holds the control lever 34 in its lower position U.

Figure 8:
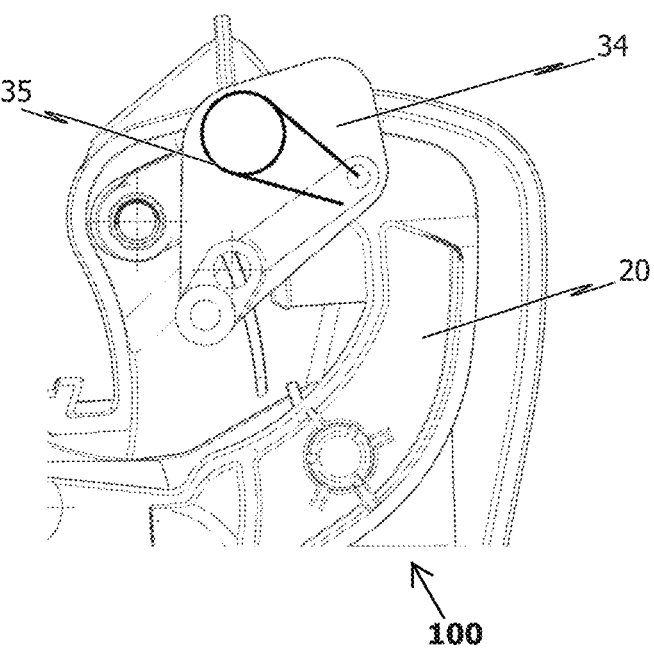
FIG. 8 shows a schematic illustration of the covering device according to the third embodiment of the present invention at the beginning of the opening process.

In FIG. 8, the drive element 40b has moved the control lever 34 into its upper position O and the elastic element 35 is visibly pretensioned. The pretensioning is also achieved here by the spring being turned or reversed. The pivot arm 20 is then subjected to an opening moment, which results in the cover 10 opening.

Figure 9:
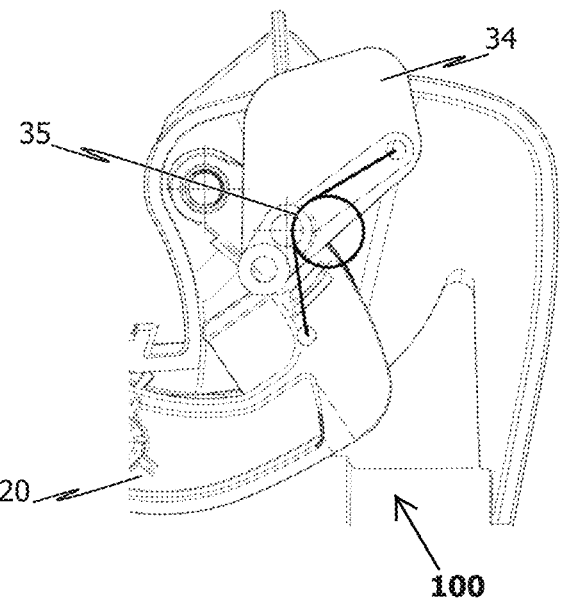
FIG. 9 shows a schematic illustration of the covering device according to the third embodiment of the present invention in an open rest position.

FIG. 9 illustrates the open rest position, in which the cover 10 is fully open. The elastic element 35 continues to subject the pivot arm 20 to an opening torque. In this state, the space behind the cover 10 is exposed, and for example refueling can take place.

Figure 10:
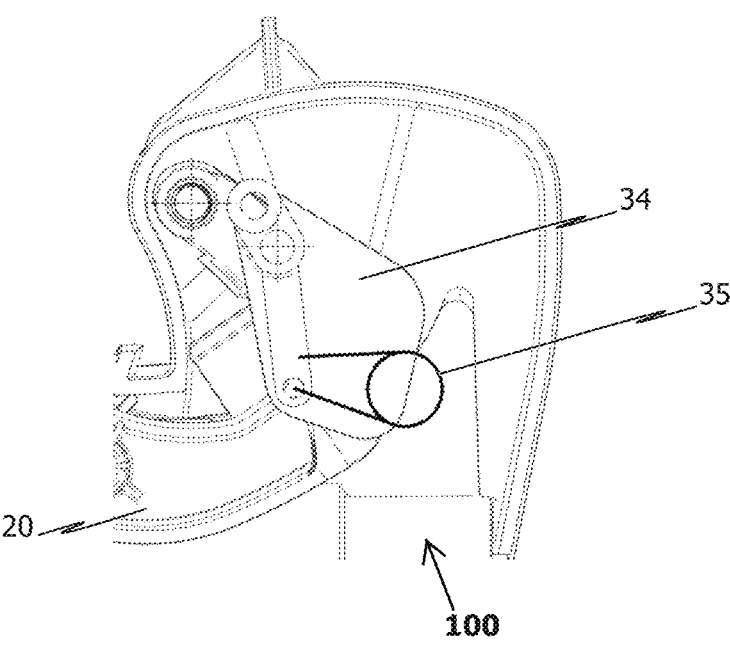
FIG. 10 shows a schematic illustration of the covering device according to the third embodiment of the present invention at the beginning of the closing process.

FIG. 10 shows the beginning of the closing process of the cover 10. Here, the drive element 40b has moved the control lever 34 into its lower position U again, and therefore the elastic element 35, once again, has been reversed and pretensioned. Accordingly, a closing moment acts on the pivot arm 20.

If the elastic element 35 is relieved of tension, the state described in FIG. 7 is re-established.

As an alternative to the first, second and third embodiments of the covering device 100, it would also be conceivable for the drive element 40 to open the cover 10 by a direct displacement, wherein an elastic element is arranged in series, as a force-limitation apparatus, between the drive element 40 and the cover 10 or the pivot arm 20.

Moreover, it would be conceivable, as an alternative, for the drive element 40 to actuate an eccentric which drives the cover 10 or the pivot arm 20. This makes it possible to achieve a longer distance and an improved transmission ratio. Here too, an elastic element is arranged in series as an overload protector in this case.

Figure 11:
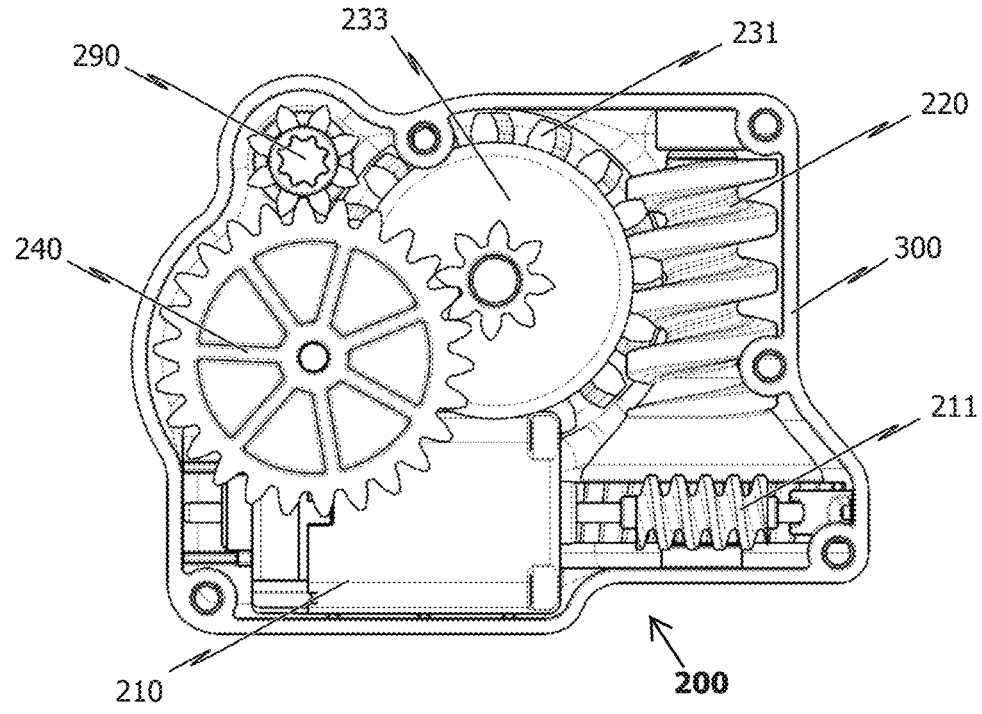
FIG. 11 shows a plan view of an actuator in a housing, with the housing cover omitted, according to one embodiment of the present invention.

FIG. 11 shows a plan view of an actuator 200 according to the present invention, the actuator being arranged in a housing 300. In order to be able to see into the interior of the actuator housing, the cover of the actuator housing 300 has been omitted here.

It is easy to see, in particular from this perspective, the space-saving way in which the individual elements are accommodated in the housing 300. This is possible, in particular, also as a result of the specific combination of worm wheels and gear wheels and the space-saving design of the force-decoupling apparatus, which will be described hereinbelow. The housing 300 itself is designed such that it at least substantially follows the contours of the outer components (i.e. those which are adjacent to the housing 300) of the actuator. This gives rise to the housing 300 being of irregular shape, but of extremely space-saving design.

Figure 13:
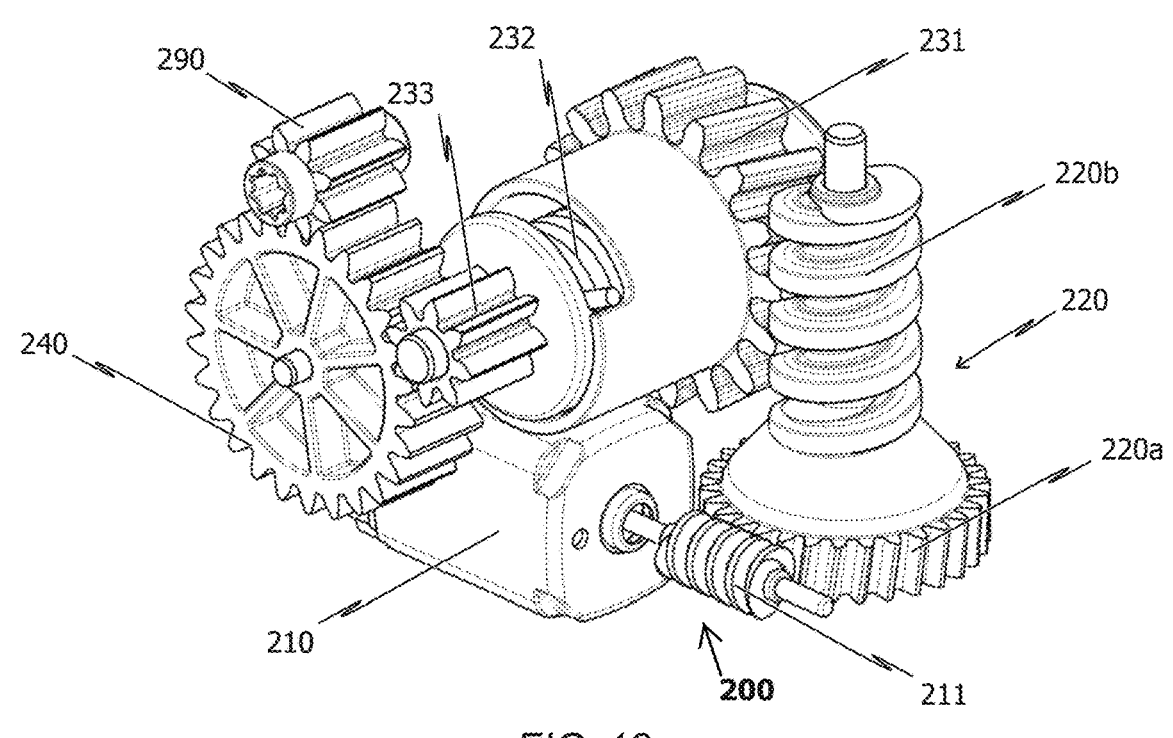
FIG. 13 shows a schematic illustration of the actuator and its elements without the housing.

FIG. 13 shows the actuator 200 in a view in which the housing 300 has also been omitted so that the elements of the actuator 200 can be seen even more clearly.

Figure 12:
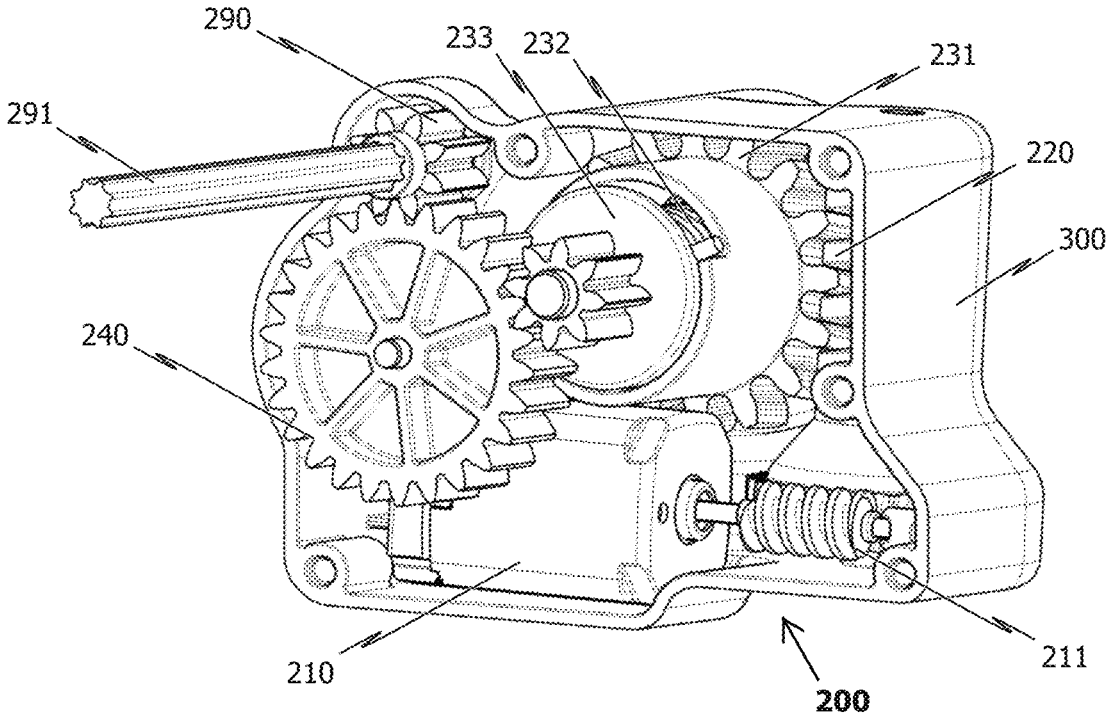
FIG. 12 shows a schematic illustration of an actuator in a housing, with the housing cover omitted, according to one embodiment of the present invention.

Reference is made hereinbelow to FIGS. 11, 12 and 13. It can be seen in FIGS. 11, 12 and 13 that the actuator 200 has a drive apparatus 210. The drive apparatus 210 is, for example, an electric motor. The drive apparatus 210 has a drive element 211, which is connected to an output spindle of the electric motor, the drive element 211 being designed in the form of a worm wheel.

The drive element 211 is coupled to a drive transmission element 220, and therefore force can be transmitted from the drive element 211 to the drive transmission element 220. In particular, torque is transmitted from the drive element 211 to the drive transmission element 220.

The drive transmission element 220 has a gear wheel 220a and a worm wheel 220b (evident, in particular, in FIG. 13), which are formed integrally with one another. This means that they are formed in one piece with one another.

In particular, the drive element 211 transmits torque to the gear wheel 220a of the drive transmission element 220.

The arrangement of the worm wheel and gear wheel makes it possible for the shaft of the drive element 211 and the shaft of the drive transmission element 220 to be offset through 900, good utilization of space therefore being possible.

The drive transmission element 220, more specifically the worm wheel 220*b* of the drive transmission element 220, is connected to an input element 231 of a force-decoupling apparatus 230. The input element 231 is connected to an output element 233 via a transmission element 232—in this case in the form of a leg spring.

The input element 231 and the output element 233 each have a region on which a gear wheel is formed.

The output element 233 is connected to an output drive transmission element 240, the output drive transmission element 240 likewise being a gear wheel. The output drive transmission element 240 is furthermore connected to an output drive element 290, which then transmits force to an output drive spindle 291.

It can be seen to good effect in particular in FIG. 13 that there is enough space in the region of the output drive transmission element 240 (alongside the force-decoupling apparatus 230) to arrange a position monitoring device, that is to say position monitoring elements. In particular, it is possible for a Hall sensor, which monitors the position of the output drive transmission element 240, to be arranged in said region.

As can be seen in particular in FIG. 11 or 12, the output drive element 290 is arranged on an outer corner of the housing 300. This makes it possible for the output drive spindle 291 likewise to be able to be arranged on the outer corner of the housing 300. This allows the output drive spindle 291 to be able to be arranged in a colinear manner in relation to a pivot axis of the covering device. Drive power can thus also be transmitted directly to the hinge arm/axis.

The output drive element 290 has an outer toothing formation and an inner toothing formation (for example also in Torx form). In particular, the outer toothing formation is connected to the output drive transmission element 240 and the inner toothing formation is connected to the output drive spindle 291, which in turn has an outer toothing formation.

As far as the transmission ratio is concerned, it can be seen, in particular, that there is a step-down ratio from the drive element 211 to the drive transmission element 220 and the transmission ratio remains substantially equal from the drive transmission element 220 to the input element 231. There is a step-down ratio from the output element 233 to the output drive transmission element 240 and a step-up ratio from the output drive transmission element 240 to the output drive element 290.

Figure 14:
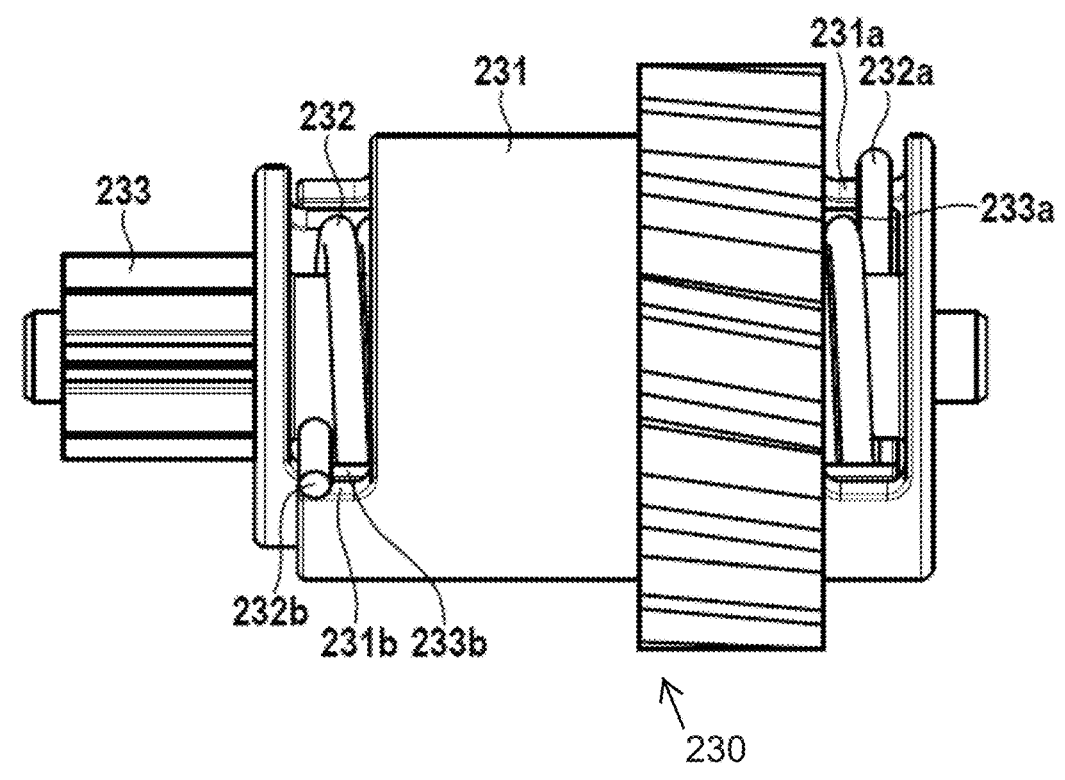
FIG. 14 shows a plan view of a force-decoupling apparatus of the actuator.

FIG. 14 shows a relatively large illustration of the force-decoupling apparatus 230. It can also be seen here that the construction of the force-decoupling apparatus 230 is an extremely space-saving one. Thus, at least certain regions of the transmission element 232 (in this case the spring element, more specifically the leg spring) are received in the output element 233. The output element 233, in turn, is received in the input element 231. The leg spring is arranged such that a first end of the leg spring 232*a* is arranged at a first longitudinal end of the output element 233 (and also of the input element 231). A second end 232*b* of the leg spring is arranged at least substantially at the opposite longitudinal end of the input element 231, and also of the output element 233.

In this example, force is transmitted from the input element 231 to the output element 233 via the ends 232*a* and 232*b* of the spring element. This force transmission is described in more detail hereinbelow:

If the gear wheel of the input element 231 in FIG. 11 moves in the clockwise direction, then a first carry-along region 231*a* of the input element 231 carries along the first end 232*a* of the spring element in the clockwise direction, and therefore the spring element, if the output element 233 is blocked, is pretensioned or, if the output element 233 is not blocked, transmits force to the output element 233. For force transmission between the spring element and output element 233, the second end 232*b* of the spring element comes into contact, or is in contact, with a second force-transmission region 233*b* of the output element 233.

In other words, if the output element 233 has not been blocked, the force is transmitted from the input element 231, more specifically the carry-along region 231*a*, to the first end 232*a* of the spring element, from the first end 232*a* to the second end 232*b*, and from the second end 232*b* of the spring element to the output element 233 or the second force-transmission region 233*b* thereof.

This progression of movement can serve, for example, to open the covering device. In this case, blockage of the output element 233 could be explained by the covering device, for example, being iced up. The opening energy is then stored in the transmission element 232, that is to say the spring element.

A similar progression arises when the input element 231 rotates in the counterclockwise direction. In this case, the second carry-along region 231*b* carries along the second end 232*b* of the spring element in the counterclockwise direction, and therefore, at the first end 232*a* of the spring element, force is transmitted to the output element 233 on a first force-transmission region 233*a*.

If the output element 233 can move freely, i.e. is not blocked, the force is transmitted from the second end 232*b* at least substantially directly to the first end 232*a* of the spring element, and the input element 231 is made to rotate by means of the first end 232*a*.

If the output element 233 is blocked (for example because the user's finger is located between the covering device and opening which is to be closed), the force, rather than being transmitted directly to the input element 231, is stored on an interim basis by the spring element. The risk of injury can thus be straightforwardly reduced. As soon as the output element 233 is free again, the energy or force stored in the spring element is output to the output element 233.

It is only in this example that the actuator 200 is designed with a transmission element 232 in the form of a spring element. As an alternative, it would be just as well conceivable for the actuator to be designed with a transmission element 232 in the form of a jaw clutch, or for use to be made of the force-limitation apparatus (for example 30*a* forming a torque-limitation means).

Moreover, it would, of course, also be conceivable to replace the force-limitation apparatus 30*a* of the covering device 100 with a force-decoupling apparatus 230 with input element 231, output element 233 and transmission element 232. The transmission element 232 here can be both a spring element and a jaw clutch. In principle here, the force-take-up part 38 of the force-limitation apparatus 30*a* would be replaced by the input element 231 and the force-output part 39 would be replaced by the output element 233.

LIST OF REFERENCE SIGNS

100 Covering device
10 Cover

20 Pivot arm
30*a*, 30*b* Force-limitation apparatus
31 Locking body
32 Pretensioning body
33 Groove
34 Control lever
35 Elastic element
36 Restoring mechanism
38 Force-take-up part
39 Force-output part
40*a*, 40*b* Drive element
41 Output gear wheel
90 Housing
200 Actuator
210 Drive apparatus
211 Drive element
220 Drive transmission element
230 Force-decoupling apparatus
231 Input element
231*a* First carry-along region
231*b* Second carry-along region
232 Transmission element
232*a* First end of the transmission element
232*b* Second end of the transmission element
233 Output element
233*a* First force-transmission region
233*b* Second force-transmission region
240 Output drive transmission element
290 Output drive element
291 Output drive spindle
300 Housing

The invention claimed is:

1. A covering device for a vehicle, wherein the covering device has the following:
a cover which is formed to cover an opening or a recess in the vehicle;
a drive element which is formed to enable a movement of the cover,
wherein the drive element brings about a force which acts on the cover and which enables the movement of the cover, wherein the covering device furthermore has a force-limitation apparatus which limits the force brought about by the drive element to a limit force so that the covering device is protected in the event of an overload acting on the covering device and/or a user is protected when using the covering device;
wherein the force-limitation apparatus has a force-take-up part and a force-output part;
wherein the force-limitation apparatus has an elastic element, for limiting force, which elastic element is arranged at least substantially within the force-take-up part.

2. The covering device as claimed in claim 1,
wherein the force-limitation apparatus is an automatically torque-shifting safety clutch which separates the cover from the drive element when the limit force is reached.

3. The covering device as claimed in claim 1,
wherein the force-output part is connected to a pivot arm of the cover and has an axis of rotation which corresponds to the pivot axis of the pivot arm.

4. The covering device as claimed in claim 1,
wherein the force-limitation apparatus is a locking body clutch which has the following:
at least one groove which is formed in the force-output part;

at least one locking body which, in a transmission state of the force-limitation apparatus, lies in the at least one groove; and
at least one pretensioning body which pushes the at least one locking body into the at least one groove,
wherein the at least one locking body reversibly slips out of the at least one groove when the limit torque is reached.

5. The covering device as claimed in claim 4,
wherein the force-limitation apparatus furthermore has a restoring mechanism which is formed to restore the force-limitation apparatus to a transmission state if the overload acting on the covering device is reduced or is no longer present.

6. The covering device as claimed in claim 5,
wherein the restoring mechanism is pretensioned if the at least one locking body has reversibly slipped out of the at least one groove and restores the at least one locking body back into the at least one groove if the overload acting on the covering device is reduced or is no longer present.

7. The covering device as claimed in claim 6,
wherein the restoring mechanism is a torsion spring which is fastened with a first side to the force-take-up part, is fastened with a second side to the force-output part and is arranged at least substantially within the force-take-up part.

8. A covering device for a vehicle, wherein the covering device has the following:
a cover which is formed to cover an opening or a recess in the vehicle;
a drive element which is formed to enable a movement of the cover,
wherein the drive element brings about a force which acts on the cover and which enables the movement of the cover, wherein the covering device furthermore has a force-limitation apparatus which limits the force brought about by the drive element to a limit force so that the covering device is protected in the event of an overload acting on the covering device and/or a user is protected when using the covering device;
wherein the force-limitation apparatus has a force-take-up part and a force-output part;
wherein the force-limitation apparatus is a locking body clutch which has the following:
at least one groove;
at least one locking body which, in a transmission state of the force-limitation apparatus, lies in the at least one groove; and
at least one pretensioning body which pushes the at least one locking body into the at least one groove,
wherein the at least one locking body reversibly slips out of the at least one groove when the limit torque is reached.

9. The covering device as claimed in claim 8,
wherein the force-limitation apparatus is an automatically torque-shifting safety clutch which separates the cover from the drive element when the limit force is reached.

10. The covering device as claimed in claim 8,
wherein the force-take-up part forms a part of a sliding block guide which is connected to the drive element.

11. The covering device as claimed in claim 8,
wherein the force-limitation apparatus furthermore has a restoring mechanism which is formed to restore the force-limitation apparatus to a transmission state if the overload acting on the covering device is reduced or is no longer present.

12. The covering device as claimed in claim 11, wherein the restoring mechanism is pretensioned if the at least one locking body has reversibly slipped out of the at least one groove and restores the at least one locking body back into the at least one groove if the overload acting on the covering device is reduced or is no longer present.

13. The covering device as claimed in claim 12, wherein the restoring mechanism is a torsion spring which is fastened with a first side to the force-take-up part, is fastened with a second side to the force-output part and is arranged at least substantially within the force-take-up part.

14. The covering device as claimed in claim 8, wherein the at least one groove is formed in the force-output part.

\* \* \* \* \*